United States Patent
Wang et al.

(10) Patent No.: US 8,248,791 B2
(45) Date of Patent: Aug. 21, 2012

(54) ELECTRONIC DEVICE HAVING ADJUSTABLE LEG

(75) Inventors: Man-Zhong Wang, Shenzhen (CN); Ju-Lan Hao, Shenzhen (CN)

(73) Assignees: Hong Fu Jin Precision Industry (ShenZhen) Co., Ltd., Shenzhen, Guangdong Province (CH); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 190 days.

(21) Appl. No.: 12/788,216

(22) Filed: May 26, 2010

(65) Prior Publication Data

US 2010/0309617 A1 Dec. 9, 2010

(30) Foreign Application Priority Data

Jun. 8, 2009 (CN) .......................... 2009 1 0303047

(51) Int. Cl.
*G06F 1/16* (2006.01)
(52) U.S. Cl. ................. 361/679.59; 248/188.8; 248/685
(58) Field of Classification Search .............. 361/679.59
See application file for complete search history.

(56) References Cited

U.S. PATENT DOCUMENTS

| | | | | |
|---|---|---|---|---|
| 4,693,444 A * | 9/1987 | Williams et al. | ............. | 248/653 |
| 6,016,248 A * | 1/2000 | Anzai et al. | ............. | 361/679.59 |
| 7,561,420 B2 * | 7/2009 | Chueh et al. | ............. | 361/679.59 |
| 7,679,905 B2 * | 3/2010 | Wu et al. | .................. | 361/679.59 |
| 7,697,283 B2 * | 4/2010 | Mathew et al. | .......... | 361/679.59 |
| 7,746,636 B2 * | 6/2010 | Tang | ........................ | 361/679.55 |
| 7,784,752 B2 * | 8/2010 | Tang | ........................ | 248/188.8 |
| 7,821,786 B2 * | 10/2010 | Hadad et al. | ............. | 361/679.59 |
| 7,855,883 B2 * | 12/2010 | Tang | ........................ | 361/679.55 |
| 7,864,515 B2 * | 1/2011 | Numata et al. | ........... | 361/679.21 |
| 7,898,801 B2 * | 3/2011 | Wang et al. | ............. | 361/679.59 |
| 7,898,802 B2 * | 3/2011 | Lian | ........................ | 361/679.59 |
| 8,050,032 B2 * | 11/2011 | Trang | ........................ | 361/679.59 |
| 8,074,956 B2 * | 12/2011 | Wang et al. | .................... | 248/688 |
| 2005/0092883 A1 * | 5/2005 | Yoshida | ..................... | 248/284.1 |
| 2010/0252710 A1 * | 10/2010 | Yang et al. | .................... | 248/398 |
| 2010/0259876 A1 * | 10/2010 | Kim | ........................ | 361/679.01 |
| 2011/0036965 A1 * | 2/2011 | Zhang et al. | .................. | 248/688 |
| 2011/0042548 A1 * | 2/2011 | Huang | .......................... | 248/685 |

* cited by examiner

*Primary Examiner* — Lisa Lea Edmonds
(74) *Attorney, Agent, or Firm* — Altis Law Group, Inc.

(57) ABSTRACT

An electronic device includes a main body and a leg. The main body includes a restriction portion. The leg is rotatably connected to the main body for supporting the main body. The leg defines grooves for being engageable with the restriction portion. When the leg rotates relatively to the main body, the restriction portion is operable to be selectively engaged with any one of the grooves to adjust a predetermined angle defined by the leg and the main body.

20 Claims, 5 Drawing Sheets

ELECTRONIC DEVICE HAVING ADJUSTABLE LEG

BACKGROUND

1. Technical Field

The present disclosure relates to electronic devices, and particularly to an electronic device with a leg which is adjustable to select a desirable viewing angle.

2. Description of Related Art

Some electronic devices are equipped with a support such as a leg that swivels out from the device to support the device on a flat surface. However, most current legs are not adjustable and the leg folds out at a predetermined angle with the electronic device. As a result, the viewing angle for different users cannot be adjusted.

Therefore, it is desirable to provide an electronic device having an adjustable leg which can overcome the above-mentioned problems.

BRIEF DESCRIPTION OF THE FIGURE

The components of the drawings are not necessarily drawn to scale, the emphasis instead being placed upon clearly illustrating the principles of the embodiment of an electronic device having an adjustable leg. Moreover, in the drawings, like reference numerals designate corresponding parts throughout several views.

DETAILED DESCRIPTION

Embodiments of the present disclosure will now be described in detail with reference to the drawings.

Figure 1:
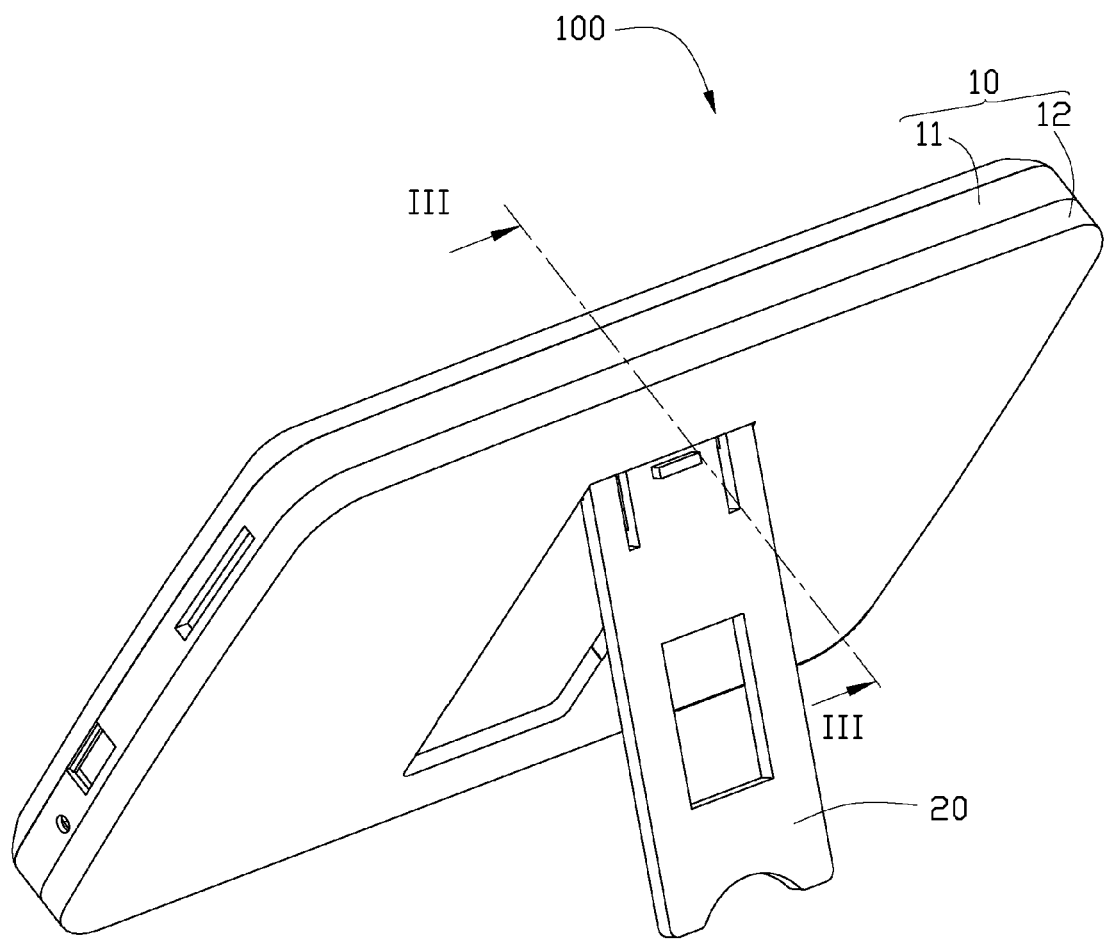
FIG. 1 is an assembled, isometric, schematic view of an electronic device having an adjustable leg in an open state, according to an exemplary embodiment.

Referring to FIG. 1, a device 100 includes a main body 10 and a leg 20 rotatably connected to and supporting the main body 10. The main body 10 includes a front body 11 and a rear cover 12 covering the back of the front body 11. In this embodiment, the device 100 may be a digital photo frame, a mobile internet device, or a GPS device, etc.

Figure 2:
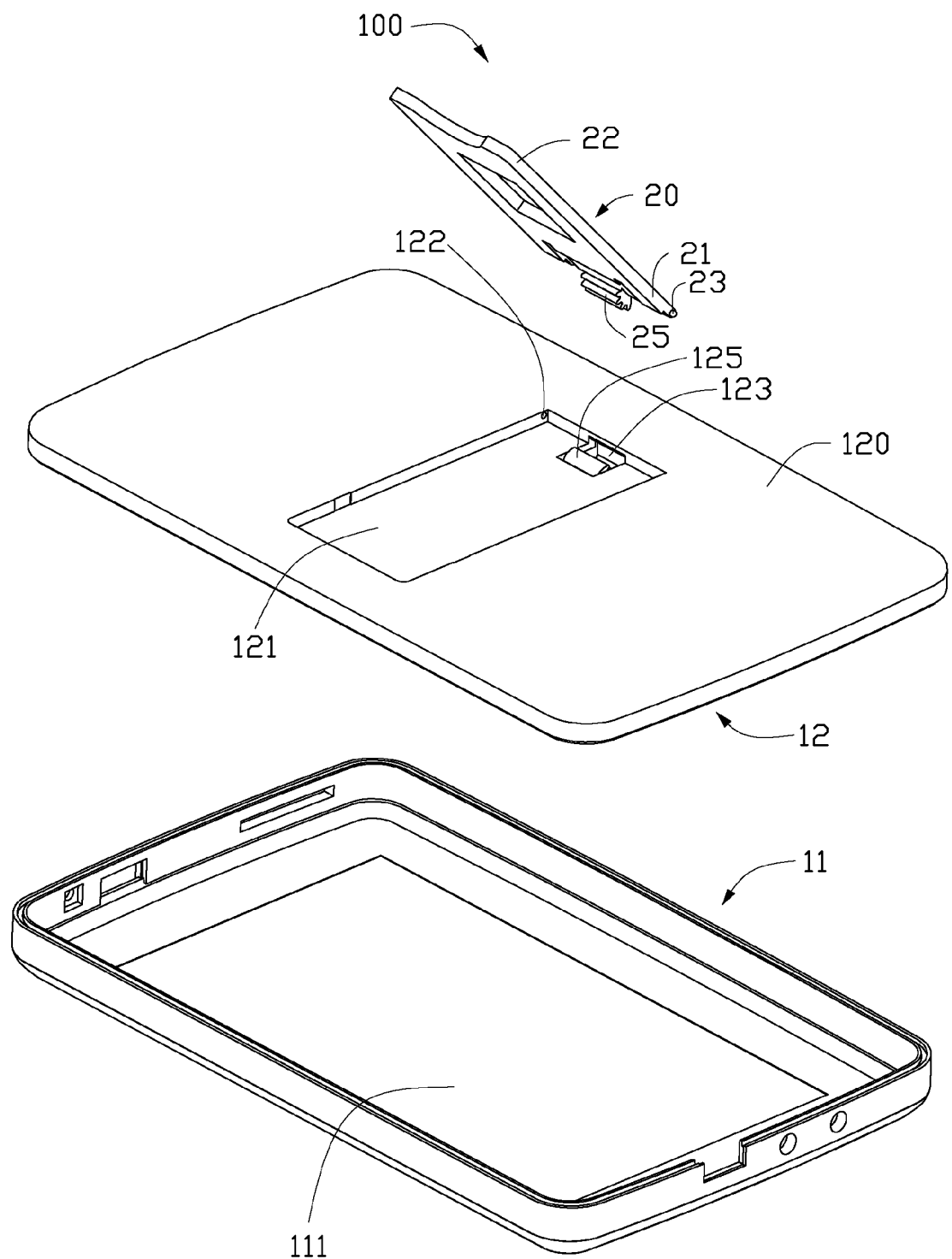
FIG. 2 is an exploded view of the electronic device of FIG. 1.
Figure 3:
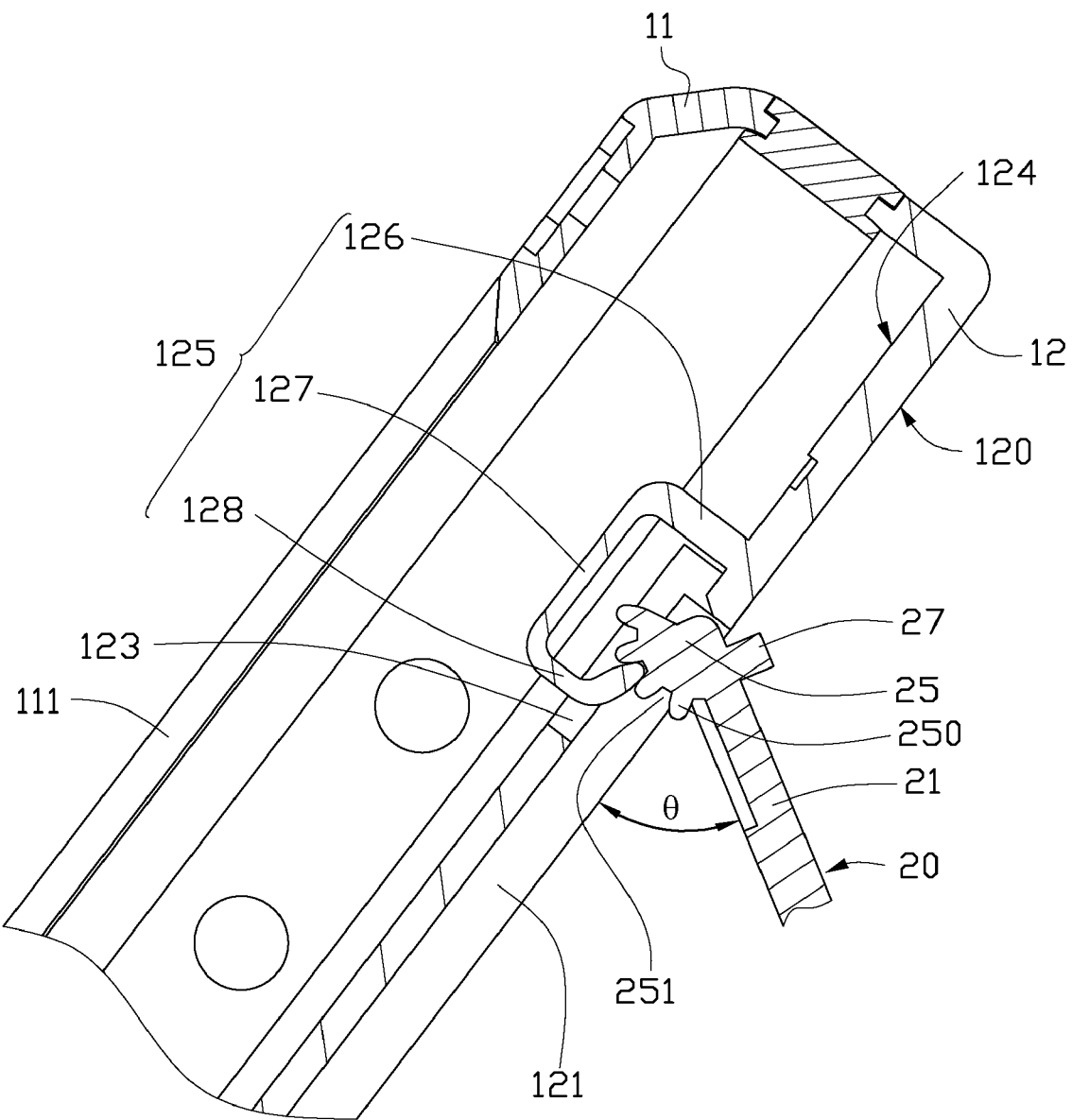
FIG. 3 is a cross-sectional view of the electronic device, taken along III-III line of FIG. 1.

Referring to FIGS. 2 and 3, the front body 11 includes a display 111. The rear cover 12 includes an outer surface 120 and an inner surface 124 opposite to the outer surface 120. The inner surface 124 faces the display 111 of the front body 11, while the outer surface 120 faces away from the display 111.

The rear cover 12 defines a recessed portion to form a substantially rectangular receiving portion 121. The receiving portion 121 is used for receiving the leg 20. The depth of the receiving portion 121 may be substantially equal to the thickness of the leg 20, therefore the outer surface of the leg 20 may be coplanar to the outer surface 120 of the rear cover 12 when the leg 20 is completely received within the receiving portion 121. The receiving portion 121 defines a hole 123 at one end of the bottom thereof. The receiving portion 121 further defines a pair of pivot holes 122 which are coaxially positioned at two opposite sides thereof. The hole 123 is located between the two pivot holes 122.

The rear cover 12 further includes an elastic restriction member 125 which may be an elastic C-shaped sheet. The elastic restriction member 125 includes a fixing portion 126, a connecting portion 127, and a restriction portion 128. The fixing portion 126 protrudes from the inner surface 124 and is adjacent to the hole 123. The connecting portion 127 perpendicularly extends from the fixing portion 126 and faces the hole 123. The restriction portion 128 is formed on the end of the connecting portion 127 and extends into the hole 123 to partly expose from the receiving portion 121. In this embodiment, the restriction portion 128 is a hook.

The leg 20 includes a first end 21, a second end 22 opposite to the first end 21, a wheel member 25, and a brake portion 27. In this embodiment, the leg 20 is a substantially rectangular plate. In other embodiments, the leg 20 can be any other shaped.

The first end 21 of the leg 20 includes two opposite sides (not labeled), and a pivot 23 protrudes from each of the two opposite sides. The first end 21 is received in the receiving portion 121. The two pivots 23 are respectively received in the two pivot holes 122. Thus, the leg 20 is pivotably connected to the rear cover 12, and is operable to be received in the receiving portion 121. The two pivots 23 act as a shaft of the leg 20.

The wheel member 25 is disposed on the first end 21 of the leg 20 and is coaxial with the shaft of the leg 20. The wheel member 25 is gear-shaped, and includes a plurality of cogs 250 radially extending therefrom. The plurality of cogs 250 is substantially aligned in an arc and is operable to be received in the hole 123. A plurality of grooves 251 is defined between each two adjacent cogs 250. The grooves 251 are engageable with the restriction portion 128. When the restriction portion 128 is engaged with one of the grooves 251, the elastic restriction member 125 is fixed by the restriction portion 128, and the restriction portion 128 prevents the wheel member 25 moving independently of the restriction portion 128. Thus, the main body 10 is selectively supported by the leg 20 in an open state at any one of several predetermined angles θ defined by the leg 20 and the main body 10.

In the open state, the leg 20 can be rotated to any one of the predetermined angles θ. When the leg 20 is rotated, the corresponding cog 250 applies a rotational force on the restriction portion 128. Because the elastic restriction member 125 is fixed to the rear cover 12, the rotational force deforms the elastic restriction member 125 and the leg 20 rotates. Then the restriction portion 128 is engaged with another groove 251.

Figure 4:
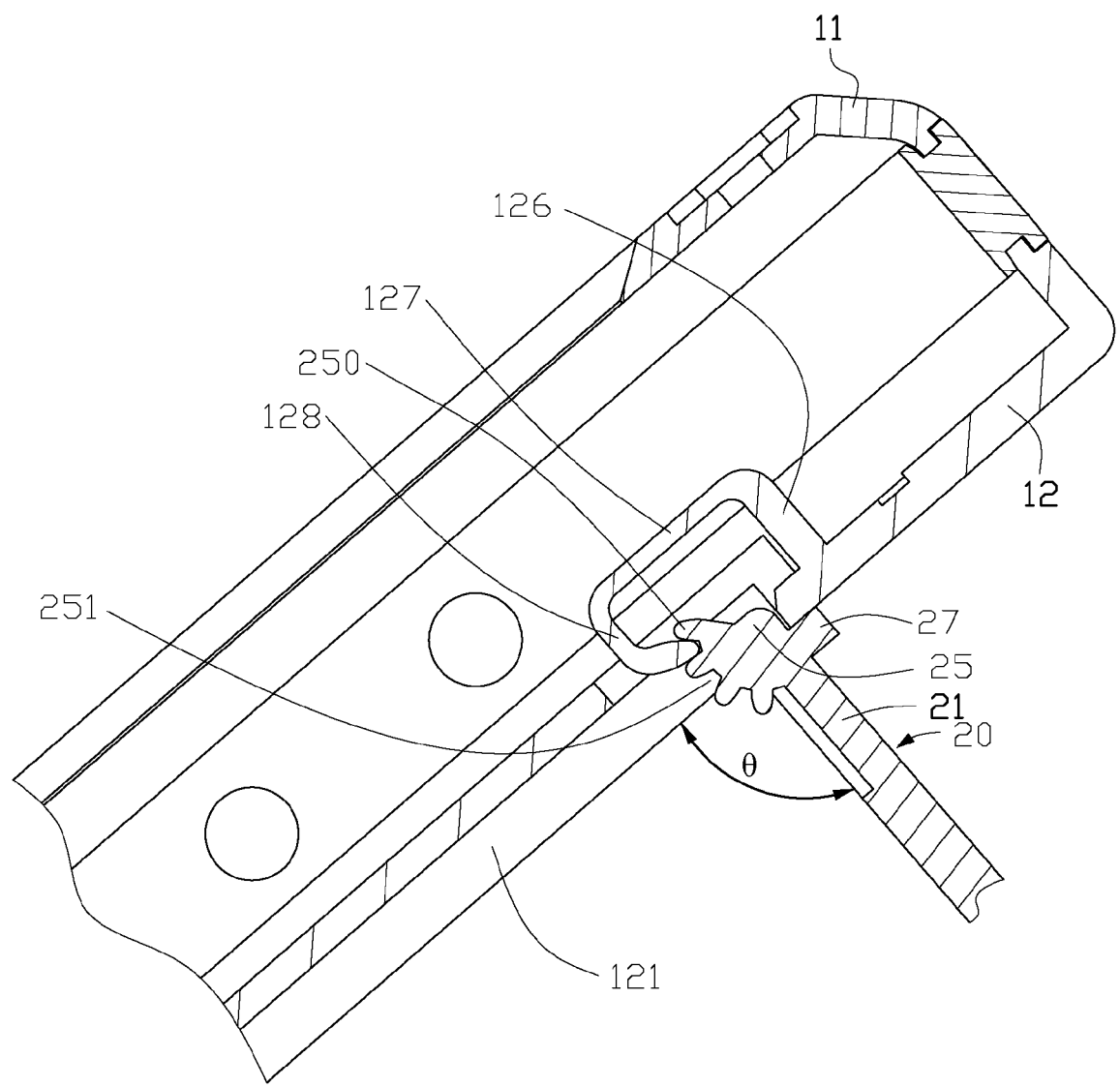
FIG. 4 is similar to FIG. 3, but showing the adjustable leg of the electronic device in another open state.

The brake portion 27 protrudes from the wheel member 25 and is on the side of the wheel member 25 that is opposite to the plurality of cogs 250. The brake portion 27 is outside of the receiving portion 121 and is used for limiting the rotation range of the leg 20. When the leg 20 rotates in a counter-clockwise direction, the limit of the rotated angle is at a maximum when the brake portion 27 abuts the rear cover 12 (see FIG. 4). That is, the predetermined angle θ is at a maximum when the brake portion 27 is blocked from further rotation by the rear cover 12.

Figure 5:
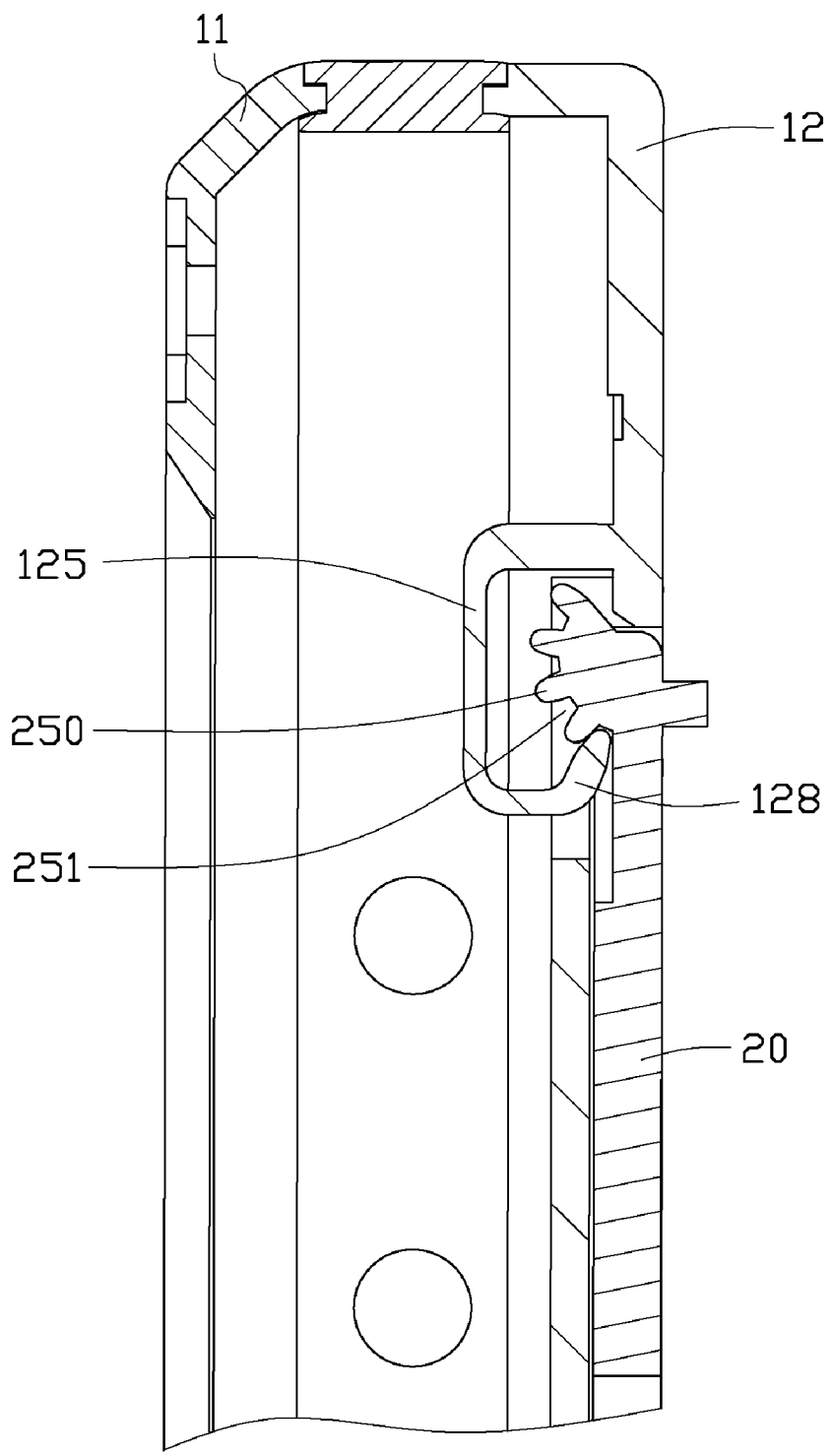
FIG. 5 is similar to FIG. 3, but showing the adjustable leg of the electronic device in a closed state.

When the leg 20 rotates in clockwise direction, the leg 20 can be received in the receiving portion 121 in a closed state (see FIG. 5). The predetermined angle θ between the leg 20 and the main body 10 can be adjusted via fixing the leg 20 at different positions corresponding to the plurality of cogs 250. Thereby, the main body 10 can be placed at an appropriate viewing angle for a user.

In some embodiments, the wheel member 25 and the elastic restriction member 125 may be together defined as an adjusting device for adjusting the angle between the leg 20 and the main body 10. The adjusting device includes a first member and a second member which is rotatably engaged with the first member. The first member as the wheel member 25 defines a plurality of grooves 251. The second member such as the elastic restriction member 125 comprises a restriction portion 128 corresponding to the plurality of grooves 251. The restriction portion 128 is operable to be selectively engaged with any one of the plurality of grooves 251 of the first member. In other embodiments, the first member can be the elastic restriction member 125 which includes the restriction portion 128, and the second member can be the wheel member 25 which defines the plurality of grooves 251.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An electronic device, comprising:
a main body comprising a restriction portion partly exposed from the main body; and
a leg, the leg rotatably connected to the main body for supporting the main body, the leg defining grooves for being engageable with the exposed part of the restriction portion;
wherein when the leg rotates relatively to the main body and the restriction portion is engaged with one of the grooves, by adjusting the angle between the leg and the main body to a predetermined angle, the restriction portion is deformed and engaged with another one of the grooves to keep the leg and the main body in the predetermined angle.

2. The electronic device of claim 1, wherein the grooves are substantially aligned in an arc.

3. The electronic device of claim 2, wherein the leg comprises a wheel member and a shaft, the shaft is operable to rotate relative to the main body, the wheel member is coaxial with the shaft, the grooves are defined on the surface of the wheel member.

4. The electronic device of claim 3, wherein the wheel member is gear-shaped, and comprises a plurality of cogs radially extending from thereof, the grooves are further defined between each two adjacent cogs.

5. The electronic device of claim 1, wherein the leg comprises a brake portion, the brake portion is operable to abut the main body to define the maximum predetermined angle.

6. The electronic device of claim 1, wherein the main body comprises a front body and a rear cover covering the back of the front body, the rear cover comprises an elastic restriction member rotatably connected with the leg, the restriction portion is formed on the elastic restriction member.

7. The electronic device of claim 6, wherein the rear cover further comprises an outer surface and an inner surface opposite to the outer surface, the inner surface faces the front body, while the outer surface faces away from the front body, the rear cover has a hole for receiving the restriction portion.

8. The electronic device of claim 7, wherein the elastic restriction member further comprises a fixing portion and a connecting portion, the fixing portion protrudes from the inner surface and adjacent to the hole, the connecting portion perpendicularly extends from the fixing portion and faces the hole, the restriction portion is formed on the end of the connecting portion and extends into the hole.

9. The electronic device of claim 8, wherein the rear cover further defines a receiving portion used for receiving the leg, the hole is adjacent to a side of the receiving portion and defined at the bottom of the receiving portion, the restriction portion are partly exposed from the receiving portion through the hole.

10. The electronic device of claim 9, wherein the receiving portion further defines a pair of pivot holes which are coaxially located at two opposite sides thereof, the hole is positioned between the two pivot holes, the leg comprises two pivots as a shaft of the leg, the two pivots of the shaft are received in the two pivot holes respectively so that the leg is rotatably connected with the rear cover.

11. An electronic device, comprising:
a main body comprising an elastic restriction member, the elastic restriction member having a restriction portion partly exposed from the main body; and
a leg connected to the main body for supporting the main body, the leg comprising a plurality of cogs, each of two adjacent cogs being operable to hold the exposed part of the restriction portion, by adjusting the angle between the leg and the main body to a predetermined angle, the restriction portion is pressed by the corresponding cog, and the elastic restriction member is deformed to make way for the cog rotating, thus the restriction portion is held by another two adjacent cogs for keeping the leg and the main body in the predetermined angle.

12. The electronic device of claim 11, wherein grooves are defined by each two adjacent cogs, the restriction portion is selectively engaged with any one of the grooves to keep the leg and the main body in the predetermined angle.

13. The electronic device of claim 11, wherein the plurality of cogs is substantially aligned in an arc.

14. The electronic device of claim 11, wherein the leg comprises wheel member and a shaft, the shaft is operable to rotate relative to the main body, the wheel member is coaxial to the shaft, the plurality of cogs is formed on the surface of wheel member.

15. The electronic device of claim 11, wherein the plurality of cogs is gear-shaped.

16. The electronic device of claim 12, wherein the leg comprises a brake portion, the brake portion is operable to be blocked by the main body to define the maximum predetermined angle.

17. The electronic device of claim 11, wherein the main body further comprises a housing for receiving the leg, the housing defines a hole, the restriction portion is received in the hole and partly expose from the main body through the hole.

18. The electronic device of claim 17, wherein the elastic restriction member further comprises a fixing portion and a connecting portion, the fixing portion protrudes from the housing and adjacent to the hole, the connecting portion perpendicularly extends from the fixing portion and faces the hole, the restriction portion is formed on the end of the connecting portion and extends into the hole.

19. The electronic device of claim 18, wherein the elastic restriction member is received in the hole.

20. An electronic device, comprising:
a main body;
a leg rotatably connected to the main body for supporting the main body; and
an adjusting device for adjusting a predetermined angle defined by the leg and the main body, the adjusting device comprising a first member and a second member which is rotatably engaged with the first member;

wherein the first member defines grooves, the second member comprises an elastic restriction portion corresponding to the grooves, and the restriction portion is engaged with one of the grooves of the first member; by adjusting the angle between the leg and the main body to a predetermined angle, the restriction portion is deformed and engaged with another one of the grooves to keep the leg and the main body in the predetermined angle.

* * * * *